Dec. 27, 1927.
S. VEGEGA
1,653,973
ATTACHMENT FOR MOTOR CARS
Filed July 29, 1925
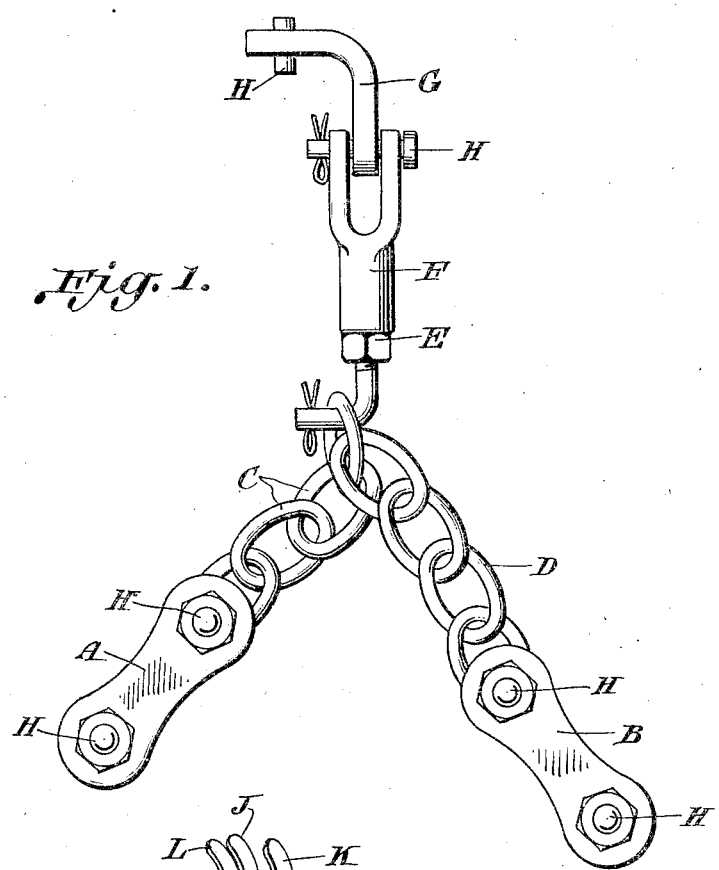
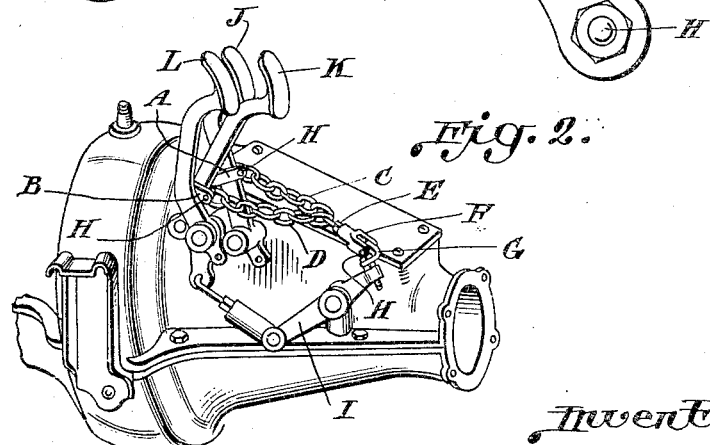
Inventor
S. Vegega
By: Marks & Clerk
Attys.

Patented Dec. 27, 1927.

1,653,973

UNITED STATES PATENT OFFICE.

SILVERIO VEGEGA, OF BUENOS AIRES, ARGENTINA.

ATTACHMENT FOR MOTOR CARS.

Application filed July 29, 1925, Serial No. 46,899, and in Argentina May 6, 1925.

This invention refers to a device for simplifying the management of a "Ford" motor car, and especially to increase the safety in the management of such vehicles.

The invention has for its object a device which may be applied to the brake and reverse pedals of a "Ford" motor car, so that the clutch may be instantaneously released on pressing either of these pedals. The great advantage of this possibility will be seen at once by any one familiar with the above mentioned vehicle, and the device of my invention has the additional advantage of being so cheap that it is within the reach of every "Ford" user.

Heretofore, in order to stop a "Ford" motor car or truck, it was necessary first to press the speed pedal with the left foot to carry it to the "dead point" and release the clutch, and then with the right foot to press the brake pedal. With the device of my invention it is not necessary to make use of the speed pedal, since by operating the brake pedal alone, the clutch is released and the coach stopped so that in the emergency of a sudden danger it is not necessary to think of the two pedals, thus losing an invaluable moment of time which may mean a human life, since the necessary sudden stop may be produced with one pedal alone. The device is also of great value in passing through crowded streets in which frequent stops are necessary, since, as above stated, a single pedal operation serves to slacken the speed and apply the brakes. Another advantage is the increased useful life of the engine, since it avoids the necessity of continually carrying it to first speed.

In the accompanying drawings, Figure 1 is a view of the device itself, and in Figure 2 t is shown in dotted lines in its attached position to the vehicle, the necessary parts of which are shown in full lines.

The device is made of iron and steel, and comprises two clevises which in both figures are indicated by the letters A and B, and which are adjustable to the brake and reverse pedals J and K by means of belts and nuts H. The clevises A and B are connected together by the chain C—D, which is attached to a distance regulating clevis F, adjustable by means of the nut E. This clevis is, in its turn, connected to the angle iron G connected to the clutch lever I by means of a bolt and nut H. The device may also be made of strong flexible wire or cable.

The operation is automatic, as already described, since the operation by pressure of the brake pedal J or of the reverse pedal K produces the instantaneous release of the clutch without necessity of using the clutch pedal L.

Having described my invention, what I claim and desire to protect by Letters Patent of the United States, is:

1. In combination, a motor vehicle including brake and reverse pedals and a clutch lever, a chain connected at its extremities with the brake and reverse pedals and permitting independent movement thereof, and means for connecting an intermediate link of said chain with the clutch lever.

2. In combination, a motor vehicle including brake and reverse pedals and a clutch lever, a chain, means connecting the opposite extremities of the chain with the brake and reverse pedals, and an adjustable connection between an intermediate link of the chain and the clutch lever.

3. In combination, a motor vehicle including brake and reverse pedals and a clutch lever, a chain having its extremities connected with the brake and reverse pedals permitting independent movement of the latter, and an adjustable means connecting an intermediate link of the chain with the clutch lever.

Signed at Buenos Aires, Argentine Republic, this 20th day of May A. D. 1925.

SILVERIO VEGEGA.